Feb. 16, 1926.

G. L. TARBOX ET AL 1,573,587

UNIVERSAL JOINT

Filed Dec. 24, 1924    3 Sheets-Sheet 2

GURDON LUCIUS TARBOX
CLARENCE WINFRED SPICER

INVENTORS

ATTORNEY

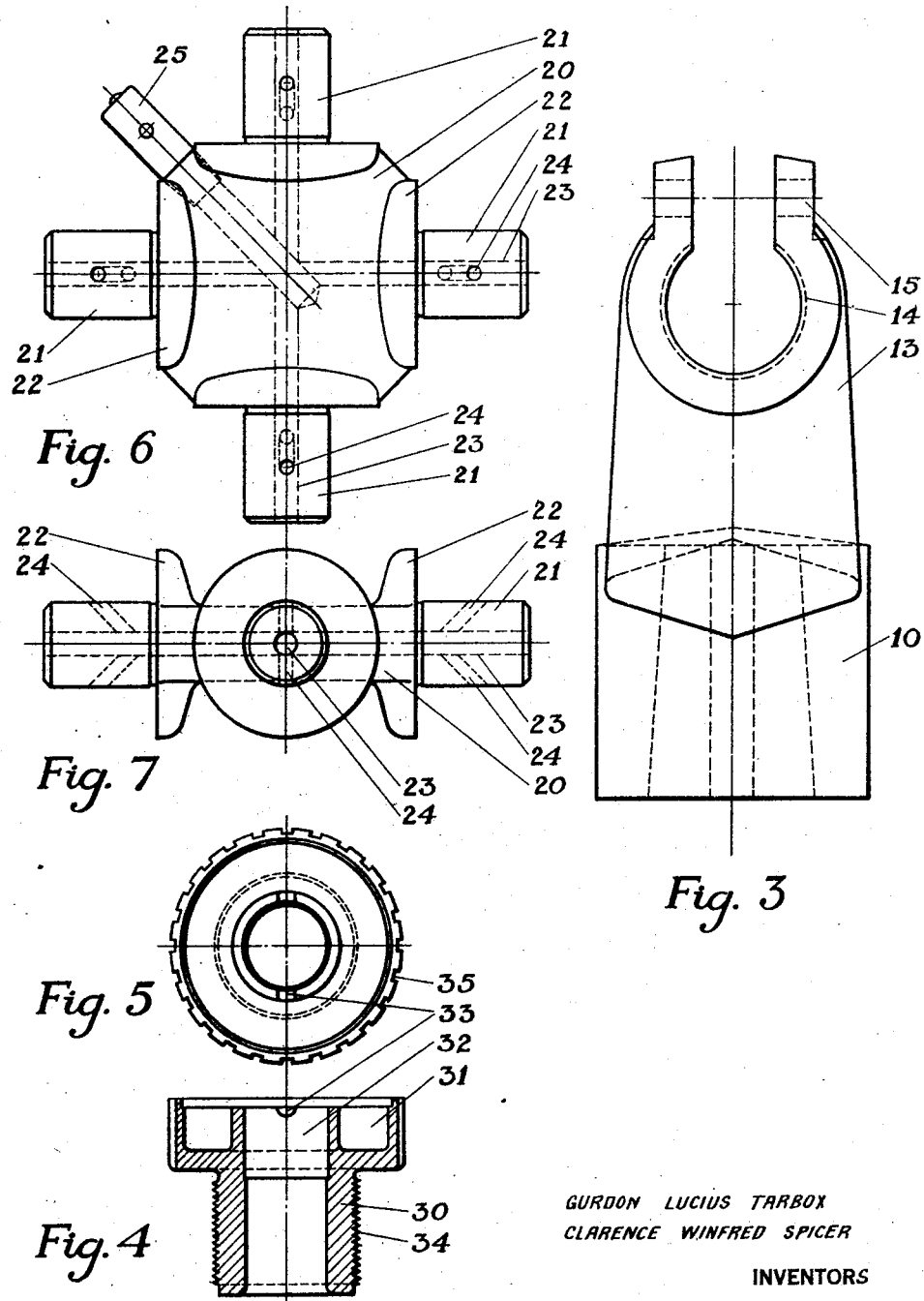

Patented Feb. 16, 1926.

1,573,587

UNITED STATES PATENT OFFICE.

GURDON LUCIUS TARBOX, OF NORTH PLAINFIELD, AND CLARENCE WINFRED SPICER, OF PLAINFIELD, NEW JERSEY.

UNIVERSAL JOINT.

Application filed December 24, 1924. Serial No. 757,887.

*To all whom it may concern:*

Be it known that we, GURDON LUCIUS TARBOX and CLARENCE WINFRED SPICER, both citizens of the United States, residing, respectively, in North Plainfield, county of Somerset, and Plainfield, county of Union, State of New Jersey, have invented certain new and useful Improvements in Universal Joints, of which the following is a disclosure.

Our invention relates to universal joints or flexible couplings of the fork and trunnion type which is distinguished by double lubricating reservoirs for each journal, one reservoir adapted to supply lubricant to the journal bearing when the joint is at rest, and the other reservoir adapted to supply lubricant to the first reservoir, and to equalize the lubricant in all the reservoirs when the joint is in motion. This invention is an improvement over the disclosure in an application filed by Gurdon Lucius Tarbox on the tenth day of December, 1924, and bearing Serial Number 755,021. Our invention has for its object the production of a system of lubrication for the journal bearings whereby the lubricant is equally distributed between the reservoirs preventing any one reservoir from running dry and thereby destroying the bearing.

Figure 1:
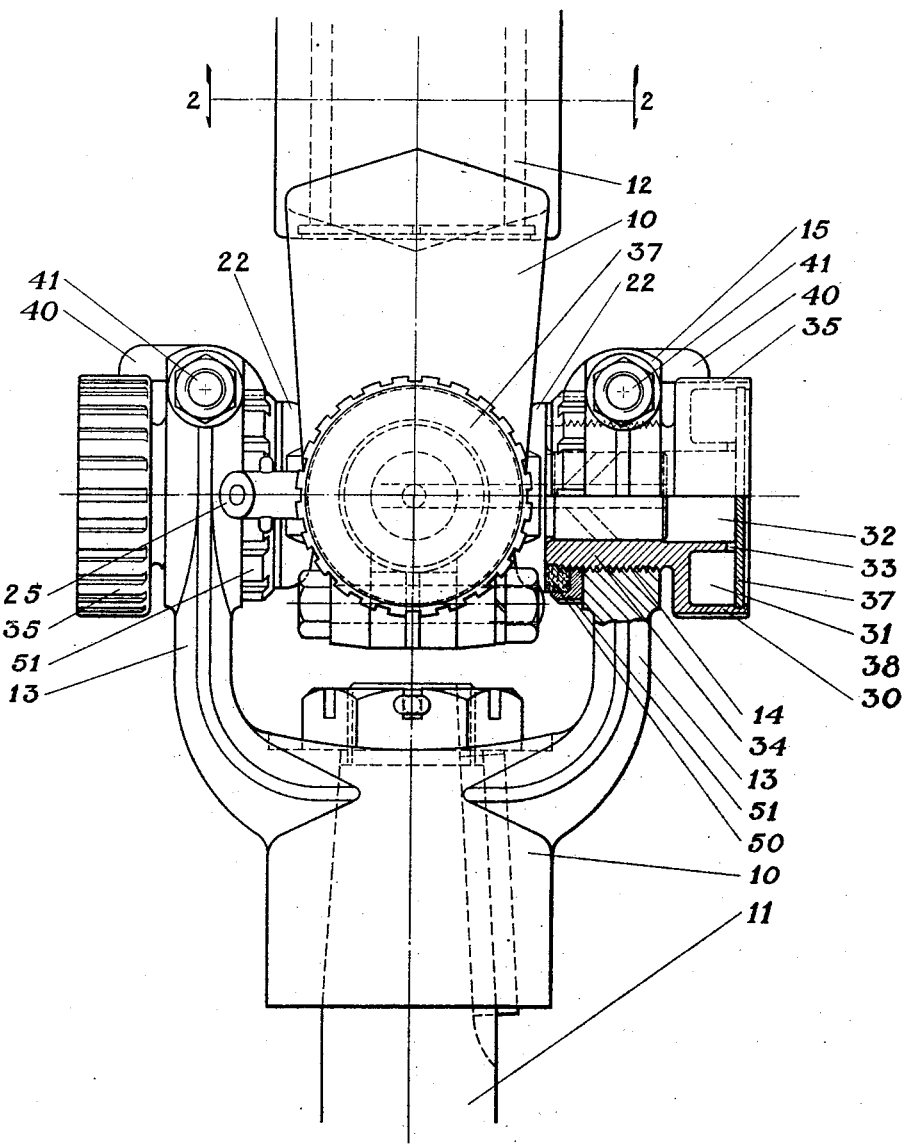

The foregoing and other features of our invention will now be described in connection with the accompanying drawings forming part of this disclosure in which we have represented our universal joint in its preferred form after which we shall point out more particularly in the claims those features which we believe to be new and of our joint invention:

In the accompanying drawings forming part of this specification:

Figure 1—is a side view of our universal joint in part section.

Figure 2:
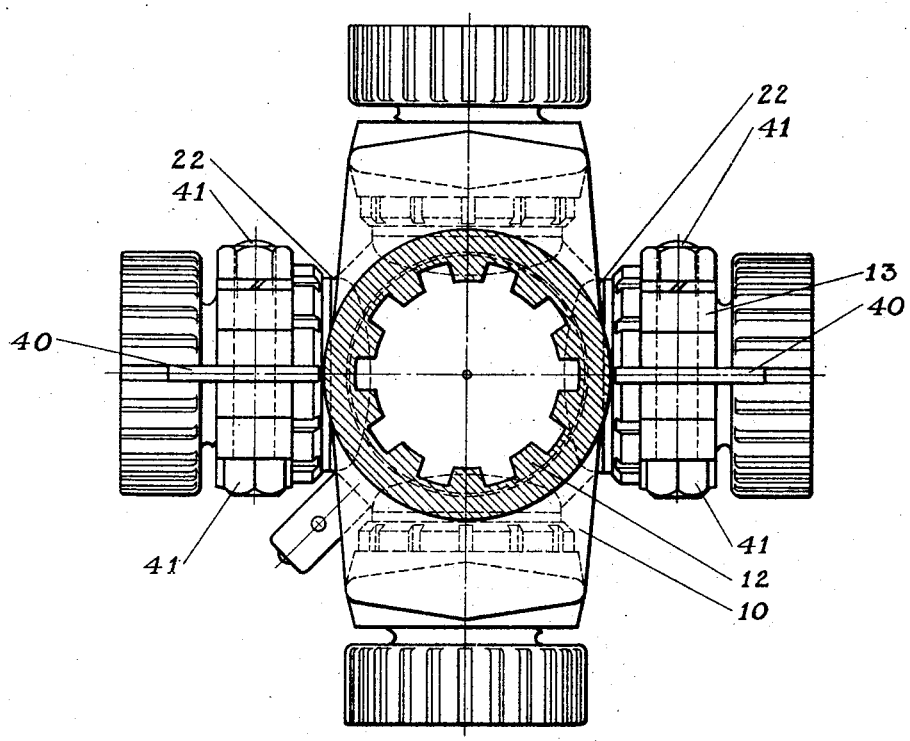

Figure 2—is and end view looking from the right and in section along the line 2—2 Figure 1.

Figure 3—is a side view of one of the fork members which we employ.

Figure 4—is a section of journal bushing and lubricating reservoirs.

Figure 5—is a plan view thereof.

Figure 6—is a plan view of our journal trunnion.

Figure 7—is a side view thereof.

In the carrying out of our invention two forked members 10 are journaled to a trunnion block 20 at right angles to each other. The forked member may be adapted to be secured direct or through a flange to a driving or driven shaft 11 or it may be provided with a spline 12 for a slip joint connection thereto.

One fork of each type is shown as is common in automotive practice. The forked member 10 is provided with two arms 13 each having threaded holes 14 into which is screwed the journal bushing 30. Means 15 is provided to clamp and hold the bushing in adjusted position.

The trunnion block 20 is provided with four journal pins 21 at right angles to each other, each journal pin having a shoulder 22 against which the journal bushing 30 bears.

It will be readily understood that any wear or lost motion can be taken up and compensated for by adjusting the position of the opposite screw bushings. This also provides a means of centering the journal trunnion as will be readily understood.

Passages 23 extend from the center of the trunnion block through the center of the journal pins 21 said passages being provided with diverging passages 24 leading to the surface of the pins. The passages diverge as they travel away from the centers of the trunnion and pins, as will be readily understood by referring to Figure 7. Means is provided as at 25 to lubricate the joint from the center of the trunnion block.

The journal bushing 30 is provided with a lubricating chamber divided into two sections, one section comprising an annular ring like reservoir 31 and a cylindrical reservoir 32 with passages 33 connecting one reservoir to the other. Extending from the reservoir is the screw member 34 which is adapted to be screwed into the forked members and be held therein. A serrated or knurled portion 35 is provided for convenience in adjusting and to receive the locking plate 40 which is adapted to be held by the bolts 41 which comprise the means for holding the journal 30 in its adjusted position in the forked member 10 and against the flange 22 of the trunnion block 20.

In order to prevent dirt and grit from working into the journal we provide a packing washer 50 and an adjusting nut 51 adapted to ride on the screw portion 34. This nut serves as a means to take up any wear of the packing ring and is held in adjusted position by the locking plate 40 in the same manner as the journal 30 is prevented from turning in the fork member 10 as previously explained.

The lubricating reservoir is closed on the outer end by a plate 37 either sweated into place or the body of the reservoir may be turned over as at 38 as shown in Figure 1.

It will be at once apparent that the lubricating chamber is located to receive the lubricant from the center of the trunnion block through centrifugal force, and that the amount in each reservoir will be distributed between the cylindrical and annular reservoirs. While at rest the lubricant in the cylindrical reservoir will be released to flow through the passages 23 to lubricate the journals while the lubricant in the annular shaped reservoir will be retained therein. All the oil not delivered to the journal and retained there by surface tension will flow into the lowest reservoir. During the next interval of running the lubricant in the annular shaped reservoir will be distributed between the cylindrical reservoir and the annular shaped reservoir. It will be apparent that with this system of lubrication the joint can not run dry as there is always maintained a portion of the lubricating material in reserve in the annular shaped reservoir.

We wish it distinctly understood that our universal joint herein described and illustrated is in the form in which we desire to construct it, and that changes or variations may be made as may be convenient or desirable without departing from the salient features of our invention and we therefore intend the following claims to cover such modifications as naturally fall within the lines of invention.

We claim:

1. A universal joint comprising two forked members journaled to a trunnion block at right angles to each other, journal bushings adapted to screw into the forked members and provided with cylindrical and annular shaped reservoirs integral therewith and outside the journal pins.

2. A universal joint comprising two forked members journaled to a trunnion block at right angles to each other, journal bushings adapted to screw into the forked members and provided with two integral intercommunicating lubricating reservoirs for each journal.

3. A universal joint comprising two forked members journaled to a trunnion block at right angles to each other, journal bushings provided with two integral intercommunicating lubricating reservoirs beyond the end of the journal, means to adjust the bushing on the journal and means to hold the journal in its adjusted position.

4. A universal joint comprising two forked members journaled to a trunnion block, journal bushings provided with two integral intercommunicating reservoirs, means carried by the forked members for securing the journals in adjusted position, packing ring and means to adjust the ring against trunnion block.

5. A universal joint comprising two forked members journaled to a trunnion block, journal bushings provided with integral lubricating reservoirs beyond the end of the journal pins, a packing ring nut carried by the journal bushing means to adjust the nut, means carried by the forked members for securing the journal bushing and the packing ring nut in adjusted position.

6. A universal joint comprising two forked members journaled to a trunnion block at right angles to each other, journal bushings adapted to screw into the forked members and provided with integral cylindrical and annular shaped reservoirs outside the journal pins and communicating passages extending through the trunnion block connecting the resrvoirs with each other.

7. A universal joint comprising two forked members journaled to a trunnion block at right angles to each other, journal bushings adapted to screw into the forked members and provided with two integral intercommunicating lubricating reservoirs for each journal and communicating passages extending through the trunnion block connecting the reservoirs with each other 8. A universal joint comprising two forked members journaled to a trunnion block at right angles to each other, journal bushings provided with two integral intercommunicating lubricating reservoirs beyond the end of the journal, means to adjust the bushing on the journal and means to hold the journal in its adjusted position and communicating passages extending through the trunnion block connecting the reservoirs with each other.

9. A universal joint comprising two forked members journaled to a trunnion block, journal bushings provided with two integral intercommunicating reservoirs, means carried by the forked members for securing the journals in adjusted position, packing ring and means to adjust the ring against trunnion block and communicating passages extending through the trunnion block connecting the reservoirs with each other.

10. A universal joint comprising two forked members journaled to a trunnion block, journal bushings provided with integral lubricating reservoirs beyond the end of the journal pins, the packing ring nut carried by the journal bushing means to adjust the nut, means carried by the forked members for securing the journal bushing and the packing ring nut in adjusted position and communicating passages extending through the trunnion block connecting the reservoirs with each other.

11. A universal joint comprising two forked members journaled to a trunnion block at right angles to each other, journal bushings adapted to screw into the forked members and provided with cylindrical and annular shaped reservoirs integral therewith and outside the journal pins and communicating passages extending through the trunnion block connecting the reservoirs with each other, converging passages extending from the communicating passages to the surface of the journal pins.

12. A universal joint comprising two forked members journaled to a trunnion block at right angles to each other, journal bushings adapted to screw into the forked members and provided with two integral intercommunicating lubricating reservoirs for each journal and communicating passages extending through the trunnion block connecting the reservoirs with each other, diverging passages extending from the communicating passages to the surface of the journal pins.

13. A universal joint comprising two forked members journaled to a trunnion block at right angles to each other, journal bushings provided with two integral intercommunicating lubricating reservoirs beyond the end of the journal, means to adjust the bushing on the journal and means to hold the journal in its adjusted position and communicating passages extending through the trunnion block connecting the reservoirs with each other, diverging passages extending from the communicating passages to the surface of the journal pins.

14. A universal joint comprising two forked members journaled to a trunnion block, journal bushings provided with two integral intercommunicating reservoirs, means carried by the forked members for securing the journals in adjusted position, packing ring and means to adjust the ring against trunnion block and communicating passages extending through the trunnion block connecting the reservoirs with each other, diverging passages extending from the communicating passages to the surface of the journal pin.

15. A universal joint comprising two forked members journaled to a trunnion block, journal bushings provided with lubricating reservoirs integral therewith and beyond the end of the journal pins, the packing ring nut carried by the journal bushing means to adjust the nut, means carried by the forked members for securing the journal bushing and the packing ring nut in adjusted position and communicating passages extending through the trunnion block connecting the reservoirs with each other, diverging passages extending from the communicating passages to the surface of the journal pins.

In witness whereof we affix our signatures.

GURDON L. TARBOX.
CLARENCE WINFRED SPICER.